June 6, 1950 M. L. ALMQUIST 2,510,271

POWER LINE CARRIER TELEPHONE SYSTEM

Filed Oct. 27, 1945 2 Sheets-Sheet 1

INVENTOR
M. L. ALMQUIST
BY
Earl C. Laughlin
ATTORNEY

INVENTOR
M. L. ALMQUIST
BY Earl C. Laughlin
ATTORNEY

Patented June 6, 1950 2,510,271

UNITED STATES PATENT OFFICE 2,510,271

POWER LINE CARRIER TELEPHONE SYSTEM

Milton L. Almquist, Maplewood, N. J., assignor to Bell Telephone Laboratories, Incorporated, New York, N. Y., a corporation of New York Application October 27, 1945, Serial No. 625,083

10 Claims. (Cl. 179—2.5)

Figure 1:
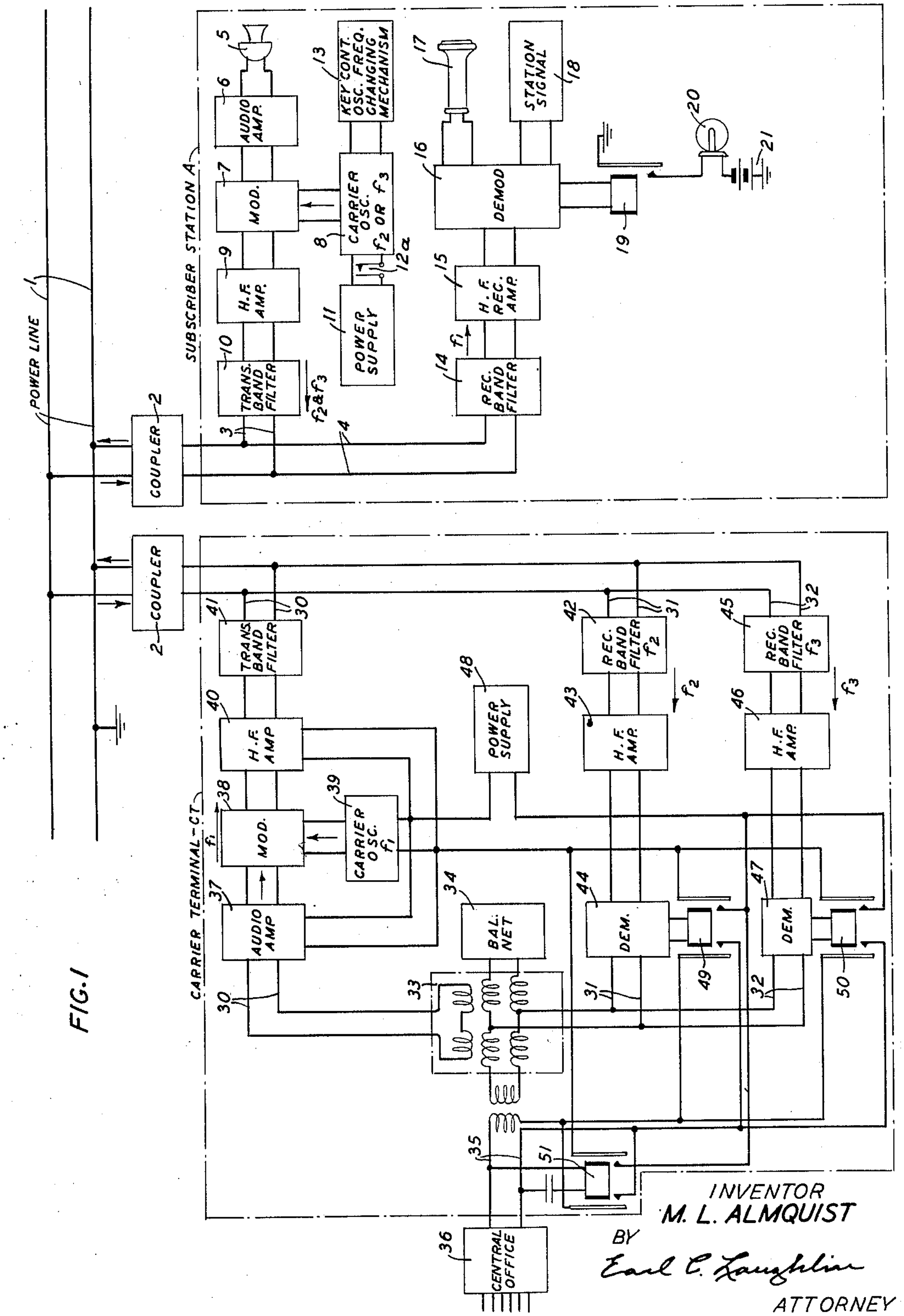

The invention relates to electric wave transmission systems and particularly to carrier wave communication systems.

An object of the invention is to cheapen and simplify communication systems of the carrier current type.

Another object is to supply two-way telephone service economically and efficiently over a common transmission medium, such as a power distribution line, to telephone subscribers in remote localities.

A more specific object is to enable two-way communication between any two of a number of subscribers on the same carrier communication system on a party line basis, as well as between any party on this carrier system and a subscriber on any other line or system to which the circuit provided by the carrier system may be connected.

The invention is specifically applicable to a system of the type in which one or more high frequency carrier telephone systems or channels are applied to a common transmission medium, such as a section of transmission line, for example, one used primarily for transmitting low frequency, high voltage power to a number of power consumers in a power distribution network. Each carrier system or channel provides a party line for a number of subscribers, and includes a corresponding number of subscriber two-way carrier telephone stations and a two-way carrier terminal station with an associated central switching office, suitably coupled to the power line or other common transmission medium. The carrier terminal station constitutes a relay and frequency changeover station for the telephone stations on the line, that is, it serves to demodulate the carrier signals received over the line from a subscriber station to voice frequencies for transmission to the central office or for remodulation on a carrier of another frequency for transmission over the line to the other subscriber stations. In addition, it serves to convert voice signals received from the central office to carrier signals for transmission to carrier subscriber stations over the line. The central office associated with the carrier terminal station provides means for connecting the telephone subscribers associated with the same carrier channel on the line in communication relation with each other or with other telephone subscribers associated with other carrier channels on the line or on outside systems.

To enable each subscriber on the line to communicate with the other subscribers on the same carrier system or channel, as well as with telephone subscribers outside that system, in accordance with the invention three different high frequency electric waves per channel are employed as carriers for both signaling and speech transmission over the line in both directions. For one carrier channel, transmission from the carrier terminal over the line to a subscriber carrier telephone station associated with that channel is always on one of the assigned carrier frequencies, say $f_1$, and transmission from each subscriber's station associated with that channel over the line to the central office carrier terminal is on either one of the two other assigned carrier frequencies, say $f_2$ and $f_3$, depending on the type of call. Voice frequency transmission is provided between the central office and the carrier terminal.

On calls between a carrier subscriber associated with one channel on the common line an outside subscriber connected through the central office, transmission from the carrier terminal to the carrier subscriber is on one of the assigned carrier frequencies, say $f_1$, and from the carrier subscriber to the carrier terminal on another of the assigned carrier frequencies, say $f_2$. For this type of call, the use of the two different frequencies $f_1$ and $f_2$ is necessary in order to avoid the "singing" difficulties which would be encountered in a system employing the same carrier frequency for transmission in opposite directions over the line when amplification is required to compensate for the transmission loss in the connections between the carrier terminal and the carrier subscriber involved in the call. The use of a single frequency system with push-to-talk operation is not practicable since connections are made through switchboards. On reverting or party line calls, that is, calls between two carrier subscribers on that same carrier system or channel, a calling subscriber transmits to the carrier terminal on the third assigned carrier frequency $f_3$ and receives from the carrier terminal on carrier frequency $f_1$, and the called subscriber transmits to the carrier terminal on carrier frequency $f_2$ and receives from that terminal on frequency $f_1$, means being provided at each subscriber's station under control of the subscriber for shifting from the normal transmitting carrier frequency $f_2$ to the reverting call carrier frequency $f_3$. On this type of call, the use of the third frequency, $f_3$, makes it unnecessary to provide the relatively complicated equipment and operating procedures required in an alternative type of system disclosed in prior art patents, in which only two carrier frequencies per channel are employed both for calls to outside subscriber stations through the central office and reverting calls between carrier subscriber stations associated with the same carrier channel on the common line; but in which for a reverting call the transmitting and receiving carrier frequencies are interchanged at the calling or called subscriber station in order to eliminate signal interference in the line and other operating difficulties which would result from the use of the same carrier transmitting and the same carrier receiving frequencies at both the calling and called station in this type of call. Other advantages of the three-carrier frequency system of the invention over the modified, alternative two-frequency system of the prior art referred to above are: (1) the former does not require that the transmitting carrier frequency of the carrier be removed from the line during a reverting call as would be necessary in the latter two-frequency system in order to prevent beats with the carrier subscriber's transmitter using the same carrier frequency, tending to cause objectionable distortion in the transmitted voice signals; (2) no busy indication need be provided at the central office in the three-frequency system during reverting calls such as would be required in the two-frequency system; and (3) the rather severe transmission requirements, such as high selectivity and wide range automatic gain control, at the carrier terminals inherent in the two-frequency system are eliminated in the three-frequency system.

Means are also provided at the carrier terminal associated with each carrier channel, responsive to each of the carrier frequencies for that channel received at the carrier terminal over the common line from a carrier subscriber to call in the operator at the central office, and to energize the transmitter at the carrier terminal to send out its assigned transmitting carrier frequency to the subscribers on that line. The transmitted carrier frequency operates a busy signal at all subscribers' stations on the same carrier channel adapted to receive on that carrier frequency.

Figures 2, 3:
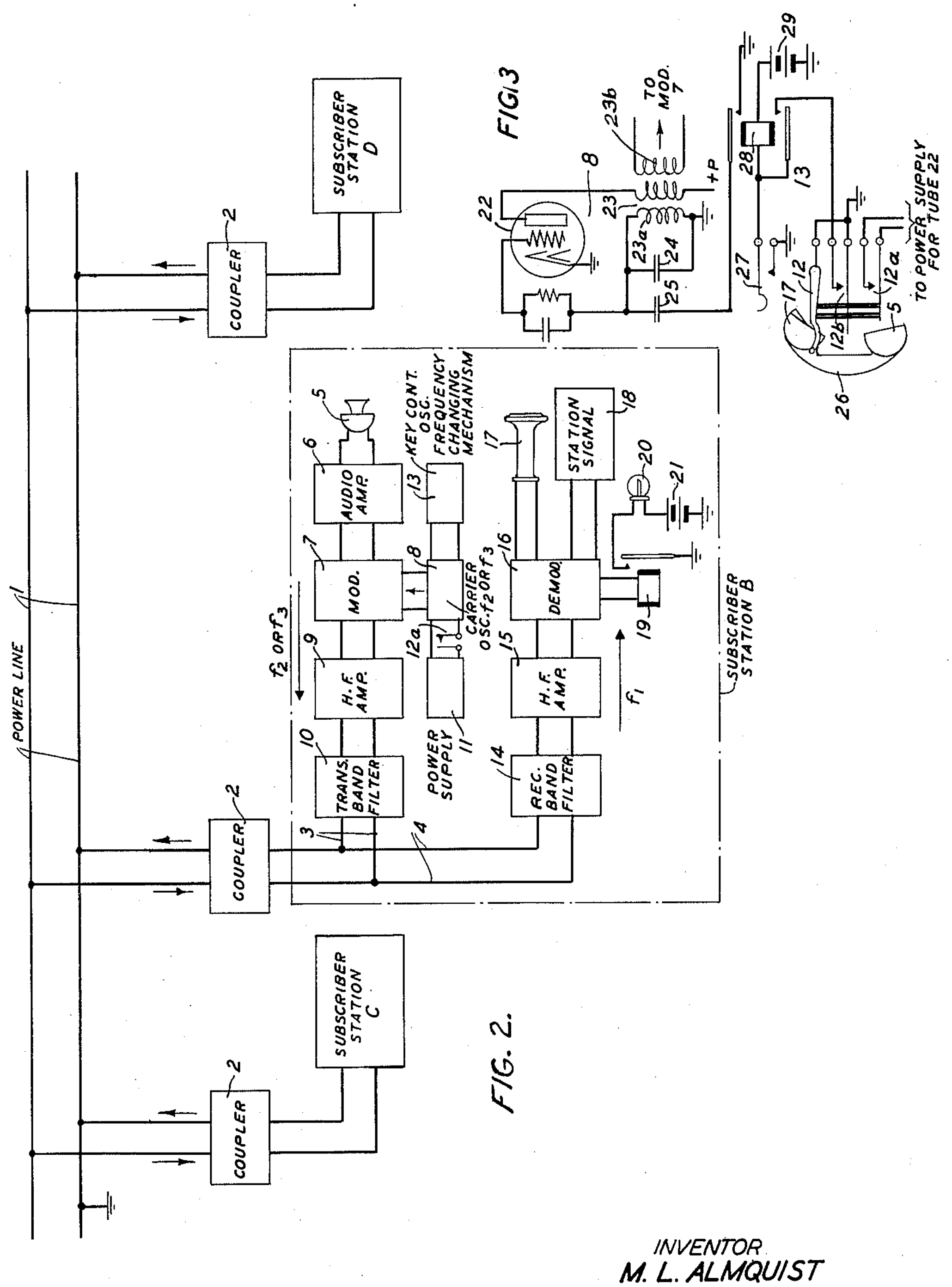

A more complete understanding of the invention will be obtained from the following detailed description when read in connection with the accompanying drawings in which:

Figs. 1 and 2, when placed side by side with Fig. 1 at the left, show in block schematic form a power line carrier telephone system embodying the invention; and Fig. 3 shows schematically one type of variable frequency carrier oscillator and the control circuits therefor which may be used at each of the subscriber stations in the system of Figs. 1 and 2.

The power line carrier telephone system of Figs. 1 and 2 includes a transmission line 1 primarily employed for transmission and distribution of low frequency, high voltage electric power and adapted for simultaneous use for high frequency carrier wave telephony. The line 1 is shown as a single phase line having one wire grounded but the carrier system to be described may be applied to any type of power or other transmission line. A plurality of like subscriber two-way carrier telephone stations A, B, C, and D included in one carrier telephone system or channel, that is, employing the same carrier transmitting and receiving frequencies, and a carrier terminal station CT for that system or channel are shown bridged across the power line 1 by suitable coupler arrangements 2, which may comprise condensers or filter arrangements (not shown), adapted for permitting the transmission of the high frequency carrier signals to or from the line and for substantially preventing transmission of the low frequency, high voltage power from the line into the subscriber carrier telephone equipment.

Each of the subscriber stations A to D, as shown at stations A and B illustrated in more detail, comprises a transmitting circuit 3 and a receiving circuit 4. The transmitting circuit 3 includes in order, reading from right to left, a telephone transmitter 5 (which may be part of a standard hand telephone set as illustrated in Fig. 3), an audio amplifier 6, a modulator 7 with an associated carrier oscillator 8, a high frequency transmitting amplifier 9, and a transmitting directional band filter 10 feeding into the line 1 through the coupler device 2. The modulator 7 may be of any suitable unbalanced type, including one or more electron discharge tubes or other variable resistance devices, adapted to combine high frequency carrier oscillations supplied to its carrier input terminals with the audio frequency signals applied to its signal input terminals, so as to produce signal sideband components as well as the unmodulated carrier component in its output. The carrier oscillator 8, when energized by its power supply 11 by the closing of the switching contacts 12*a* (which may be switch contacts on telephone hook switch 12 such as shown in Fig. 3), is adapted to supply to the modulator 7 carrier oscillations either of the high frequency $f_2$ or $f_3$ depending on the operating condition of the associated key-controlled oscillator frequency changing mechanism 13 one type of which will be described later in connection with Fig. 3.

The receiving circuit 4 includes in order, reading from left to right, the receiving directional band filter 14 fed from the line 1 through the coupler device 2, the high frequency receiving amplifier 15, the demodulator 16 of any suitable type and the telephone receiver 17 (which may be combined in a standard hand telephone set with the telephone transmitter 5 as shown in Fig. 3).

The receiving circuit 4 at each subscriber's station also includes station signal apparatus 18 associated with the output of the demodulator 16, which may be a voice frequency ringer responsive to the frequency at which the received carrier is modulated, such as 20 cycles per second, during ringing intervals, and an electromagnetic relay 19 adapted to be operatively energized from the output of the demodulator 16 when high frequency carrier signals are applied to its input, to close an operating circuit for the busy signal lamp 20 from the battery 21.

The directional band filter 10 in the transmitting circuit 3 is adapted to selectively transmit the voice signal-modulated carrier waves (one or more signal side bands) of the high frequencies $f_2$ and $f_3$ applied thereto from the output of the modulator 7, as well as the unmodulated carrier frequency components of these frequencies, and the directional band filter 14 in the receiving circuit 4 is adapted to selectively transmit the voice signal-modulated carrier wave of the high frequency $f_1$, as well as the unmodulated carrier of that frequency, received from the line 1.

As illustrated in Fig. 3, the carrier frequency oscillator 8 at each subscriber's station A to D may comprise a single three-electrode electron discharge device 22 having its plate circuit coupled to its grid circuit through the feedback winding 23*a* on output transformer 23, the effective inductance of that transformer winding and the capacitances of the associated condensers 24 and 25 of suitably selected values determining the frequency of oscillation. The plate and cathode heater of the oscillator tube 22 are normally deenergized and are adapted to be energized from the associated power supply (power supply 11) when the subscriber removes his handset 26 from the hook switch 12, by the resultant closing of the normally open lower switch contacts 12*a* in the energizing circuit for the tube. In the normal condition of the oscillator circuit shown, with the condenser 24 only connected in shunt with the feedback winding 23*a* of transformer 23, the inductance and capacitance in the frequency determining circuit of the oscillator are such that the latter, when energized, oscillates at the high frequency $f_2$ and the resultant carrier oscillations of that frequency are supplied through the output winding 23*b* on transformer 23 to the carrier input terminals of modulator 7 in the high frequency transmitting circuit 3. With the oscillator tube 22 energized (handset 26 off the switchhook 12), the frequency of the carrier oscillations supplied to modulator 7 may be changed to the high frequency $f_3$ by the subscriber by pressing his non-locking "frequency change" key 27. This closes an operating circuit for the electromagnetic relay 28 from battery 29. With relay 23 operated, the additional condenser 25 of suitably selected value is connected in shunt with the feedback winding 23*a* of transformer 23 through the closed upper contacts of that relay, which changes the oscillator tuning to the required frequency, and the relay 28 is locked operated from battery 29 through the closed lower switch contacts of that relay and the closed upper contacts 12*b* of hook switch 12 in series, so as to maintain the oscillator tuned to the frequency $f_3$ when the frequency change key 27 is released. When the subscriber replaces his handset 26 on the hook switch 12, the upper and lower contacts 12*a* and 12*b* of that switch are returned to the open condition, as shown, disconnecting the power supply from the oscillator tube 22 and releasing relay 28 to revert the tuning of the oscillator to the frequency $f_2$.

The carrier terminal station CT comprises a transmitting circuit 30 and two receiving circuits 31 and 32. The output of the transmitting circuit 30 and the inputs of the two receiving circuits 31 and 32 are connected in parallel with each other and through the common coupler device 2 to the line 1. The input of the transmitting circuit 30 and the outputs of the two receiving circuits 31 and 32 are connected by means of the partially unbalanced bridge transformer or hybrid coil circuit comprising hybrid coil 33 and associated line balancing network 34 to the two-wire voice frequency line 35 leading to the central telephone switching office 36 for the subscriber stations on the power line. The central office 36, which may be of the manual or automatic type, may be utilized also for connecting the telephone subscribers on the power line 1 to any of the telephone subscribers outside the carrier system in the associated telephone network. The central office 36 is normally effectively disconnected from carrier terminal station CT due to the normal break in line 35 provided through the normally open left-hand switching contacts of relays 49, 50 and 51. The operation of any one of these relays to close its contacts will enable the line 35.

The transmitting circuit 30 includes in order between the hybrid coil 33 and the coupler device 2, reading from left to right, an audio amplifier 37, a modulator 38 with associated oscillator 39 for supplying thereto carrier oscillations of the high frequency $f_1$, the high frequency transmitting amplifier 40 and the transmitting directional band filter 41 adapted to transmit one or both signal side band products as well as the unmodulated carrier of the frequency $f_1$ received from the output of the modulator 38. The receiving circuit 31 includes in order between the coupler device 2 and the hybrid coil 33, reading from right to left, the directional band filter 42 adapted for selectively transmitting the speech-modulated and unmodulated carrier waves of the frequency $f_2$ received over the line 1, the high frequency amplifier 43 and the demodulator 44 for demodulating the applied high frequency modulated carrier waves to voice frequencies. The receiving circuit 32 includes in order between the coupler device 2 and the hybrid coil 33, reading from right to left, the receiving directional band filter 45 adapted for selectively transmitting the speech-modulated and unmodulated carrier waves of the frequency $f_3$ received over the line 1, the high frequency receiving amplifier 46 and the demodulator 47 for demodulating the applied high frequency signal waves to voice frequencies.

The audio amplifier 37, the high frequency transmitting amplifier 40 and the carrier oscillator 39 in the transmitting circuit 30 in the carrier terminal station CT, are normally deenergized. They are adapted to be energized from the power supply 48 through the made right-hand switching contacts of any one of the three electromagnetic relays 49, 50 and 51 when the relay is operated. The relay 49 operates in response to the rectified output current of the demodulator 44 in the receiving circuit 31 when a received carrier wave of the frequency $f_2$ is applied to the demodulator input, relay 50 in response to the rectified output current of demodulator 47 in receiving circuit 32 when a received carrier wave of the frequency $f_3$ is applied to the input of the latter demodulator; and relay 51 in response to ringing current transmitted from the central office 36 over voice frequency line 35 to the carrier terminal CT.

The operation of the system of the invention will now be described with reference to Figs. 1, 2 and 3.

*Call between power line telephone subscriber and outside telephone subscriber*

When a telephone subscriber in a carrier system on the power line 1, for example the subscriber at station A, wishes to call a subscriber outside the system to which the former is assigned, through the central office 36, he lifts his handset 26 off the switchhook 12, which in the manner previously described in connection with Fig. 3, causes the carrier oscillator 8 at the station to be energized to supply carrier oscillations of the frequency $f_2$ to the modulator 7 in transmitting circuit 3. The unmodulated carrier component of frequency $f_2$ appearing in the output of modulator 7 will be amplified in the amplifier 9 and the amplified wave will be transmitted through the band-pass filter 10 and the coupler device 2 to the power line 1, over which it will be transmitted to the carrier terminal station CT. The received carrier wave of frequency $f_2$ will pass through the coupler device 2 at the carrier terminal station CT and will be selected by the directional band filter 42 in the receiving circuit 31. The selected carrier of frequency $f_2$ will be amplified in amplifier 43 and rectified in demodulator 44. The rectified current in the output of demodulator 44 will operate relay 49. The operated relay 49 through its made left-hand contacts will close the line loop 35 which by suitable connections (not shown) at central office 36 may be made to operate a lamp or other calling device in that office to call in the central office operator. The operated relay 49 through its made right-hand contacts will also connect the power supply 48 to the carrier oscillator 39, the audio amplifier 37 and the high frequency transmitting amplifier 40 in the transmitting circuit 30, causing these apparatus elements to be energized. Carrier oscillations of the frequency $f_1$ will then be transmitted from the carrier oscillator 39 to modulator 38 and the unmodulated component of frequency $f_1$ in the output of that modulator will be transmitted through the high frequency amplifier 40, the transmitting band filter 41 and coupler device 2 to the power line 1 over which it will be transmitted to all the subscriber stations A to D on that line.

At each subscriber's station the received carrier wave of frequency $f_1$ will be transmitted through the coupler device 2, the receiving band filter 14, the receiving amplifier 15 and demodulator 16, and the rectified output of the latter will cause the operation of the associated relay 19 to cause the busy signal lamp 20 to be operated from battery 21, thus indicating to the subscribers at all carrier stations on the power line that the power line is in use on a call.

The subscriber at station A then talks into his transmitter 5 and his speech currents after amplification in the audio amplifier 6 are combined in modulator 7 with the carrier oscillations of frequency $f_2$ from oscillator 8. One or both sidebands of the resulting modulation products, after amplification in the amplifier 9, pass through the transmitting band filter 10 and the coupler device 2 to the line 1 and are transmitted over that line to the carrier terminal station CT. At the latter station, the speech-modulated carrier wave of frequency $f_2$ passes through the coupler device 2 to the receiving circuit 31 and, in the manner previously described for the unmodulated carrier wave of frequency $f_2$, passes through that circuit to the demodulator 44. The demodulator 44 demodulates the voice signals from the carrier wave, and a portion of the demodulated signals will be transmitted through the hybrid coil 33 and voice frequency line 35 (maintained closed by the continued operation of relay 49) to the central office 36 and will be heard by the central office operator. The subscriber at station A tells the central office operator what subscriber outside the carrier system to whom he wishes to be connected, and the operator in the usual manner calls the desired subscriber on the associated telephone network and sets up a talking connection through the central office 36, line 35, carrier terminal CT and the line 1 between the latter subscriber and subscriber A so that the called and calling subscribers can converse with each other.

The voice signals of the called outside subscriber will be transmitted at voice frequencies from the central office over the voice frequency line 35 to the carrier terminal station CT, and will be impressed by the hybrid coil 33 on the transmitting circuit 30 at that station. In that circuit, the called subscriber's voice signals will be amplified in the audio amplifier 37 and the amplified signals modulated in modulator 38 with the carrier oscillations of frequency $f_1$ from the associated oscillator 39 previously energized in response to operation of relay 49. The voice-modulated carrier of frequency $f_1$ in the output of that modulator will be amplified in amplifier 40 and passed through the transmitting band filter 41 and coupler device 2 to the power line 1 and over that line to the calling station A. At the latter station, the voice-modulated carrier wave of frequency $f_1$ will pass through the coupler device 2 and will be selected by the directional band filter 14 in the receiving circuit 4. The selected signals of the outside subscriber will be amplified in amplifier 15, demodulated in the demodulator 16, and will be heard by the subscriber A in his telephone receiver 17.

At the end of the call, the subscriber at station A will hang up his handset on hook switch 12 causing the opening of the switching contacts of the latter to disconnect the power supply from his carrier oscillator 8. The deenergization of this oscillator will stop transmission of the carrier wave of frequency $f_2$ over the line 1. At the carrier terminal CT, the relay 49 which had been held operated by $f_2$, will release to remove power from the carrier oscillator and the amplifiers in transmitting circuit 30 so as to stop the transmission of $f_1$ over the line, and also to open line 35 to disconnect the central office 36 from the carrier terminal CT, thus returning the latter to its normal unoperated condition shown.

A call to a subscriber on the power line 1 may be initiated by the central office operator at the request of an outside subscriber in the telephone network associated with central office 36, by transmitting ringing current, say of 20 cycles per second, over the line 35 to operate relay 51. The operated relay 51 through its made left-hand contacts will complete the connection of line 35 to the hybrid coil 33 of the carrier terminal CT allowing the ringing current to enter the transmitting circuit 30 and to be applied to the signal input of modulator 38. The operated relay 51 through its made right-hand contacts will cause the carrier oscillator 39 and the amplifiers 37 and 40 in the transmitting circuit 30 to be energized from power supply 48, so that an amplified carrier wave of the frequency $f_1$ modulated with the ringing current received from the central office 36 will be sent out through the coupler device 2 to the line 1 and over that line to the carrier subscriber stations A to D. The portion of this modulated carrier diverted from line 1 at each of the subscriber's stations A to D will be selected by the receiving band filter 14, amplified by amplifier 15 and will be demodulated in the demodulator 16 to operate the associated station signal (ringer) 18 and busy lamp 20 at the station in the manner previously described.

As the relay 51 at the carrier terminal CT will remain operated to maintain the apparatus elements in transmitting circuit 30 energized so as to send out the modulated carrier of frequency $f_1$, only during the times of application of the ringing current to that relay, the central office operator by interrupting the transmission of the ringing current at predetermined intervals in accordance with a particular code assigned to the station to be called may produce corresponding interruptions of the transmitted modulated carrier of frequency $f_1$, and thus of the operation of station signal device or ringer 18 at each of the stations A to D.

The subscriber at the called station on the power line, recognizing his coded ring, answers by removing the handset 26 from the hook switch 12 at his station. This will cause his carrier oscillator 8 to be energized to transmit the carrier of frequency $f_2$ over the line 1 to the carrier terminal CT where it will be selected by the band filter 42 in the receiving circuit 31, amplified by amplifier 43 and applied to the demodulator 16 to cause the operation of the associated relay 49. This will close the line loop 35 to the central office 36, and will energize the carrier oscillator and amplifiers in the transmitting circuit 30, in the manner previously described, so that the carrier wave of frequency $f_1$ is transmitted out over the line 1, thus setting up the circuits for two-way conversation between the calling and called subscribers through the carrier terminal CT and the central office 36.

The conversation of the subscriber at the called station on the power line will be transmitted over the line 1 to the carrier terminal CT as modulations of the transmitted carrier of frequency $f_2$, and at the carrier terminal will be demodulated to voice frequencies by the demodulator 44 in receiving circuit 31, and will be transmitted at voice frequencies through the hybrid coil 33, the line 35 and central office 36 to the calling subscriber.

The conversation of the calling subscriber outside the carrier system to the called subscriber on the power line will be at voice frequencies to the carrier terminal station CT and at the latter station the received voice frequencies will be modulated on the carrier frequency $f_1$ and transmitted from that station to the called carrier subscriber's station on the power line, in the manner previously described.

*Call between two carrier subscriber stations on power line*

To make an intra-party line on reverting call, say to a subscriber at station B, the subscriber at station A presses his non-locking key 27 before removing his handset 26 from the switchhook 12, which operatively energizes the relay 28 from battery 29. The operation of the relay 28 in the manner previously described in connection with Fig. 3 will cause the tuning of his carrier oscillator 8 to be changed to the reverting carrier frequency $f_3$. Then, holding the key 27 closed, subscriber A will remove his handset 26 from the switchhook 12 which will cause the oscillator 8 to be energized from the power supply 11 and the relay 28 to be locked operated from battery 29 in the manner previously described. The subscriber at station A may then release his key 27, but because of the locked condition of his relay 28, his oscillator 8 will be maintained tuned to supply the frequency $f_3$ to the modulator 7 in his transmitting circuit 3. The unmodulated carrier component of frequency $f_3$ in the output of the modulator 7 will be amplified by the amplifier 9 and the amplified wave transmitted through the transmitting directional band filter 10 and the coupler device 2 to the line 1 over which it will be transmitted to the carrier terminal station CT. At the carrier terminal station, the received unmodulated carrier wave of frequency $f_3$ will be transmitted through the coupler device 2 to the receiving circuit 32 in which it will be selected by the receiving band filter 45, amplified by the high frequency amplifier 46 and rectified by demodulator 47 to cause the operation of relay 50.

The operated relay 50 through its made left-hand contacts will close the line loop 35 to central office 36 to operate a lamp or other calling device to call in the central office operator. The operated relay 50 through its made right-hand contacts will close an energizing circuit for the carrier oscillator 39 and the amplifiers 37 and 40 in the transmitting circuit 30 of the carrier terminal station from the power supply 48. This will cause carrier waves of the frequency $f_1$ supplied by the carrier oscillator 39 to be transmitted through modulator 38, amplifier 40, the transmitting band filter 41 and the coupler device 2 to the power line 1 over which it will be transmitted to the subscribers' stations A to D to light up the busy lamp 20 at each of these stations in the manner which has been previously described, to indicate to the subscribers at these stations that a call is in process.

The calling subscriber at station A by talking into his transmitter 5 modulates the carrier of frequency $f_3$ from carrier oscillator 8 in modulator 7 with his voice signals, and the voice-modulated carrier wave of that frequency in amplified form is transmitted over the power line 1 to the demodulator 47 in the receiving circuit 32 at the carrier terminal station CT, as previously described for the unmodulated carrier of frequency $f_3$. The demodulated voice signals of subscriber A in the output of the demodulator 47 at the carrier terminal will be transmitted through hybrid coil 33 and the previously enabled voice frequency line 35 to the operator in the central switching office 36.

The central office operator then rings station B on the power line, as requested by subscriber A, in the manner previously described in connection with a call from an outside subscriber.

The called subscriber B on operation of his station signal device 18 to provide the signal assigned to his station, answers by lifting his desk set 26 off the telephone switchhook 12 causing his carrier oscillator 8 to be energized to transmit carrier oscillations of the carrier frequency $f_2$ (the frequency change key 27 being unoperated) to the modulator 7 in his transmitting circuit 3, and by talking into his transmitter 5 causes his voice signals to be sent out over the line on his normal carrier frequency $f_2$ to the carrier terminal station CT in the manner previously described.

At the carrier terminal station CT, the received voice-modulated carrier wave of frequency $f_2$ is diverted through the coupler device 2 into the receiving circuit 31 and in that circuit is selected by the receiving band filter 42, amplified by the high frequency amplifier 43 and demodulated in the demodulator 44. A portion of the demodulated voice signals of subscriber B is transmitted from the output of the demodulator 44 through the unbalanced hybrid coil 33 to the transmitting circuit 30 of the carrier terminal station CT in which, after amplification by the audio amplifier 37, it modulates the carrier wave of frequency $f_1$ in the modulator 38. The speech signals of subscriber B modulated on the transmitted carrier wave of frequency $f_1$ are then transmitted through the high frequency amplifier 40, the directional band filter 41 and coupler device 2 at the carrier terminal station to the power line 1 and are transmitted thereover to the subscriber station A. At the subscriber's station A, the received carrier wave of frequency $f_2$ modulated with the voice signals of subscriber B enters the receiving circuit 4 of that station, and subscriber B's voice signals appearing in the output of the demodulator 16 in that circuit are transmitted to the telephone receiver 17 and are heard by subscriber A.

The voice signals of the calling subscriber A modulated on a carrier wave of the frequency $f_3$ received at the carrier terminal over the line 1, are similarly demodulated from the carrier wave in the demodulator 47 in the receiving circuit 32 and the demodulated voice signals passed through the unbalanced hybrid coil 33 at the carrier terminal to the transmitting circuit 30 in which they will be modulated on the carrier wave of frequency $f_1$ and passed out over the power line 1 to station B where they are demodulated in demodulator 16 from the carrier wave and are heard by subscriber B in his receiver 17.

When the call between subscribers' stations A and B on the power line is completed, the calling subscriber A hangs up his desk set 26 which automatically deenergizes his carrier oscillator 8 stopping the transmission of $f_3$ and reverts the oscillator to its normal tuning ($f_2$) in the manner which has been previously described in connection with Fig. 3. Similarly, the called subscriber B on hanging up his handset 26 deenergizes his carrier oscillator and cuts off $f_2$ from the line. The circuits at the carrier terminal CT will then return to their normal condition shown due to the release of relays 49 and 50.

The invention has been described as applied to only one carrier system or channel on the power line 1, but it is apparent that a number of different carrier systems may be operated on the same power or other common line or transmission medium by the assignment of three different carrier frequencies for each carrier system or channel, in which case separate carrier terminals associated with the same or different central switching offices would be employed for each individual system, the apparatus and circuit arrangements at the stations being identical with those in the system described above and illustrated in the drawings except for the changes required in the carrier oscillators and band filters due to the use of different carrier frequencies for the several systems. Other changes in the circuits illustrated and described which are within the spirit and scope of the invention will occur to persons skilled in the art.

What is claimed is:

1. In combination in a telephone system, a transmission line, subscriber stations including a plurality of carrier subscriber stations connected to said line, a two-way carrier terminal connected to said line and a central office including switching means for interconnecting the calling and called subscriber stations in two-way communication relation, said carrier terminal including transmitter means for sending out signals supplied thereto, modulated on a carrier wave of one frequency over said line to said carrier subscriber stations, each of said carrier subscriber stations including receiver means for demodulating and detecting the signals incoming over said line on a carrier wave of said one frequency, transmitter means for sending the signals initiated at the station, including the local subscriber's talking signals, out over said line to said carrier terminal on a carrier wave of either a second or a third frequency, switching means which in one operated condition selects said second carrier wave frequency for the transmitted signals and in another operated condition selects said third carrier frequency for the transmitted signals and means for operating said switching means to said one or to said other operated condition, said carrier terminal including separate receiver means for demodulating the talking signals incoming over said line on said line on said carrier wave of said second and said third carrier frequency, respectively, and means for supplying a portion of the demodulated signal output of each of said receiver means to said central office and another energy portion thereof to said transmitter means at said terminal for remodulation on the carrier wave of said one frequency outgoing over said line to said carrier subscriber stations.

2. In a telephone system comprising subscriber lines and stations including party lines, a central office arranged to establish conversational connections between calling and called subscriber lines, a transmission line, a two-way carrier terminal interconnecting one of said party lines and said transmission line and a plurality of carrier subscriber stations permanently connected to said transmission line, said carrier terminal including transmitter means for sending out signals including voice signals, supplied thereto on a carrier wave of one frequency over said transmission line to said carrier subscriber stations, each of said carrier subscriber stations including receiver means for demodulating and detecting the signals incoming over said transmission line on a carrier wave of said one frequency, transmitter means for transmitting signals including the voice signals of the local subscriber, over said transmission line on a carrier wave of either one of two other frequencies and other means for selecting the particular one of said carrier waves of said two other frequencies to be used for transmitting the outgoing signals, one of said two other carrier wave frequencies being selected when the called station is also one of said carrier subscriber stations and the other of said two other carrier wave frequencies being selected when the called station is other than one of said carrier subscriber stations.

3. In combination in a telephone system, a transmission line, subscriber stations including a plurality of carrier subscriber stations connected to said line, a two-way carrier terminal connected to said line and a central office including switching means for interconnecting calling and called subscriber stations in two-way conversational relation, said carrier terminal including transmitter means for sending signals including voice signals, modulated on a carrier wave of one frequency out over said line to said carrier subscriber stations, each of said carrier subscriber stations including receiver means for demodulating and detecting the signals incoming over said line on a carrier wave of said one frequency, a source of carrier waves of a second frequency, a source of carrier waves of a third frequency, transmitter means for sending the signals initiated at the station, including the voice signals of the local subscriber, on a carrier wave of either said second or said third frequency out over said line to said carrier terminal and switching means associated with the two carrier sources and with said transmitter means for selecting the carrier wave of said second frequency for the transmitted outgoing signals from the station when the local station has initiated the call and the called station is also a carrier subscriber station, and for selecting the carrier wave of said third frequency for the transmitted outgoing signals for calls involving the local station and a subscriber station which is not one of said carrier subscriber stations, said carrier terminal also including separate receiver means for demodulating the signals incoming over said line on said second and said third carrier wave frequency, respectively, and means for supplying separate energy portions of the demodulated signal outputs of said separate receiver means to said central office, and to the transmitter means at the terminal for remodulation therein on the outgoing carrier wave of said one frequency.

4. In a two-way carrier communication system, a transmission line and stations coupled to said line, said stations including a carrier terminal station and a plurality of subscriber carrier communication stations, at least one of said subscriber stations including transmitting means adapted to be conditioned to send out communication signals modulated on a carrier wave of one frequency over said line to said terminal station and receiving means for detecting the communication signals modulated on carrier waves of a second frequency incoming over said line, at least one other of said subscriber stations including transmitting means adapted to be conditioned for sending out communication signals modulated on a carrier wave of a third frequency over said line to said terminal station and receiving means for detecting the communication signals modulated on a carrier wave of said second frequency incoming over said line, said carrier terminal station including transmitting means for sending out communication signals supplied thereto on a carrier wave of said second frequency over said line to said subscriber stations and receiving means operative to selectively receive the carrier waves of said one and said third frequency incoming over said line from said one and said other subscriber station, respectively, and to demodulate the communication signals therefrom, and means to supply the demodulated communication signals to the transmitting means at said terminal station for retransmission on the carrier wave of said second frequency sent out thereby over said line to said subscriber stations.

5. The system of claim 4, in which said transmitting means at said terminal station is normally disabled and said terminal station includes switching means operating in response to the selected carrier waves of said one frequency or of said third frequency received at that station from said line to enable that transmitting means.

6. In a two-way carrier communication system, a transmission line and stations coupled to said line including a carrier terminal station and a plurality of subscriber carrier communication stations, each of said subscriber stations including a receiver operative to detect communication signals modulated on carrier waves of one frequency received at that station over said line and a transmitter which is adapted to send out over said line to said terminal station communication signals modulated on a carrier wave of either a second frequency or a third frequency, said carrier terminal station including a transmitter for sending out communication signals supplied thereto, modulated on a carrier wave of said one frequency over said line to said subscriber stations, two receivers respectively operative to receive the carrier wave of said second and said third frequency incoming over said line from said subscriber stations, and to demodulate the communication signals therefrom, and means to supply one energy portion of the demodulated signals to the transmitter at said terminal station for retransmission by modulation on the transmitted carrier wave of said one frequency over said line to said carrier subscriber stations.

7. The system of claim 6, in which the transmitter at said carrier terminal station is normally deenergized and said carrier terminal station includes a source of power and switching means operative in response to a carrier wave of said second frequency or a carrier wave of said third frequency received at that station from said line to connect said source of power to said transmitter so as to energize it.

8. In combination in a telephone system, a main transmission line, a plurality of other lines, a carrier terminal station connected to said main line, subscriber stations including a plurality of carrier stations connected to said main line and other stations connected to said other lines, and a central office including switching means for interconnecting calling and called subscriber stations in conversational relation through said carrier terminal station, each of said carrier subscriber stations connected to said main line including a receiver operative to detect communication signals including voice signals received at the station over said main line modulated on a carrier wave of a frequency $f_1$, a transmitter for sending out signals initiated at the station, including the voice signals of the local subscriber over said main line to said terminal station modulated on a carrier wave of a second frequency $f_2$ for a call between the local subscriber station and an outside subscriber station on one of said other lines connected to said main line through the central office and said carrier terminal, or modulated on a carrier wave of a third frequency $f_3$ for a party-line call between the local station and another carrier subscriber station on the main line if the call is initiated at the local station and switching means for determining whether the carrier wave used for the transmitted signals is of said second frequency $f_2$ or of said third frequency $f_3$, said carrier terminal station including a transmitter operative under control of signals transmitted from said central office, or in response to the receipt of a carrier wave of the frequency $f_2$ or of the frequency $f_3$ at the terminal station from said main line, to send out communication signals supplied thereto, modulated on a carrier wave of said frequency $f_1$ over said main line to the carrier subscriber stations thereon, two receivers for respectively selectively receiving the carrier waves of said frequency $f_2$ and of said frequency $f_3$ incoming over said main line, and for demodulating the communication signals therefrom, and means to supply the demodulated signals to said central office or to the transmitter at said terminal station for retransmission by that transmitter as modulations of the transmitted carrier wave of frequency $f_1$ over said main line to said subscriber stations.

9. The system of claim 8, in which the transmitter at each of said carrier subscriber stations on said main line is normally conditioned to transmit on a carrier wave of said frequency $f_2$, and each of said carrier subscriber stations includes manually operable keying means for conditioning the transmitter to transmit on a carrier wave of said frequency $f_3$.

10. The system of claim 8, in which said transmitter at each carrier subscriber station includes a modulator with an associated normally-deenergized carrier wave oscillator which, when energized, supplies carrier wave oscillations to said modulator for combination therein with communication signals of the local subscriber to produce a signal-modulated carrier wave for transmission over said main line, said carrier wave oscillator being normally tuned to the frequency $f_2$, manually operable non-locking keying means for changing the tuning of said carrier wave oscillator to the frequency $f_3$, switching means operable separately to cause said oscillator to be energized and other means responsive to operation of said switching means, if said keying means is operated at the time, to lock the tuning of said carrier wave oscillator at said frequency $f_3$ for the duration of the party line call.

MILTON L. ALMQUIST.

REFERENCES CITED

The following references are of record in the file of this patent:

UNITED STATES PATENTS

| Number | Name | Date |
|---|---|---|
| 1,603,657 | Wolfe | Oct. 19, 1926 |
| 2,289,048 | Sandalls | July 7, 1942 |
| 2,292,222 | Haigis | Aug. 4, 1942 |
| 2,294,905 | Honaman | Sept. 8, 1942 |